United States Patent [19]

Numakura

[11] Patent Number: 4,531,355
[45] Date of Patent: Jul. 30, 1985

[54] JIG FOR ASSEMBLING A TRACK CHAIN

[75] Inventor: Hirotomo Numakura, Kawasaki, Japan

[73] Assignee: Maruma Jyusharyo Kabushikigaisha, Tokyo, Japan

[21] Appl. No.: 519,355

[22] Filed: Aug. 1, 1983

[30] Foreign Application Priority Data

Jan. 14, 1983 [JP] Japan .................................. 58-3306

[51] Int. Cl.³ .............................................. B21L 5/00
[52] U.S. Cl. ...................................................... 59/11
[58] Field of Search ............................ 59/7, 11, 8, 35;
269/296, 309, 310; 29/281.1, 281.3, 283, 251, 255, 282

[56] References Cited

U.S. PATENT DOCUMENTS

| 3,097,477 | 7/1963 | Rodgers | 59/7 |
| 3,421,750 | 1/1969 | Tridgell | 269/310 |
| 3,901,488 | 8/1975 | Riddle | 269/309 |
| 3,938,798 | 2/1976 | Solie et al. | 269/310 |
| 3,939,648 | 2/1976 | Cullen | 59/11 |
| 4,007,584 | 2/1977 | Wolff | 59/11 |

Primary Examiner—Robert C. Watson
Attorney, Agent, or Firm—Flynn, Thiel, Boutell & Tanis

[57] ABSTRACT

A jig is disclosed for assembling a track chain which includes pin adapters and bushing adapters attached detachably to tool bars. Each adapter is provided with an outer cylinder, an inner cylinder received slidably in the outer cylinder, a biasing device held within the outer cylinder for biasing the fore end of said inner cylinder so that it protrudes outwardly from the fore end opening of the outer cylinder, and a stop attached to the outer cylinder for preventing the inner cylinder from protruding excessively out of the outer cylinder. Circular recesses are formed in the inner peripheral surface of the fore end opening of the outer cylinder.

8 Claims, 9 Drawing Figures

JIG FOR ASSEMBLING A TRACK CHAIN

FIELD OF THE INVENTION

This invention relates to a jig for assembling a track chain that is universally employed in construction equipment and the like.

BACKGROUND OF THE INVENTION

Figure 1:
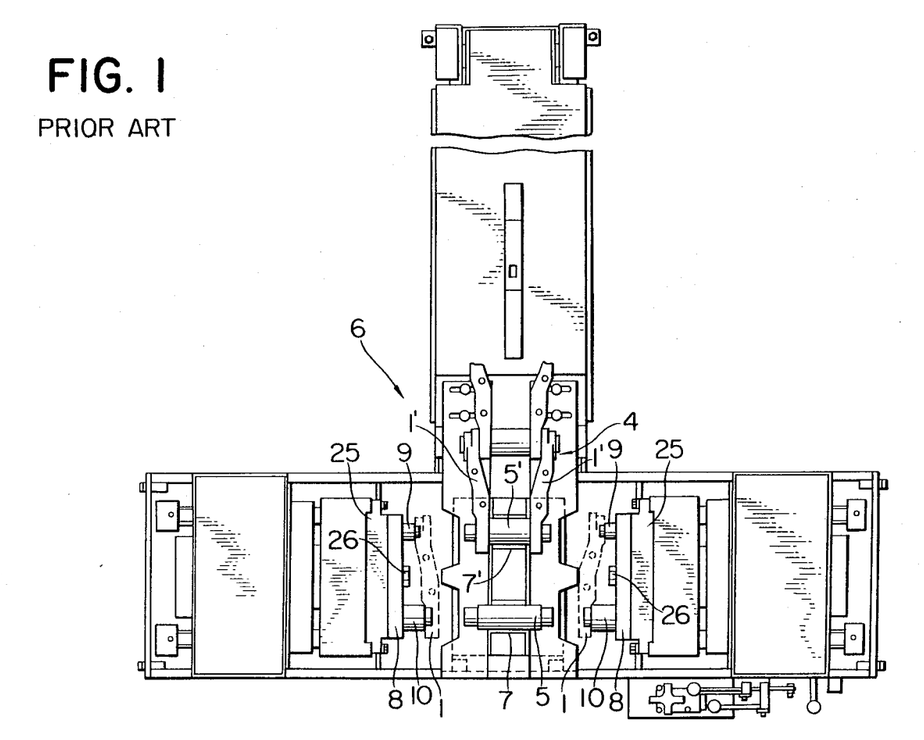
FIG. 1 is a plan view showing the state of a known track press, to which the assembling jig according to this invention is applied, before a track chain is assembled.
Figure 2:
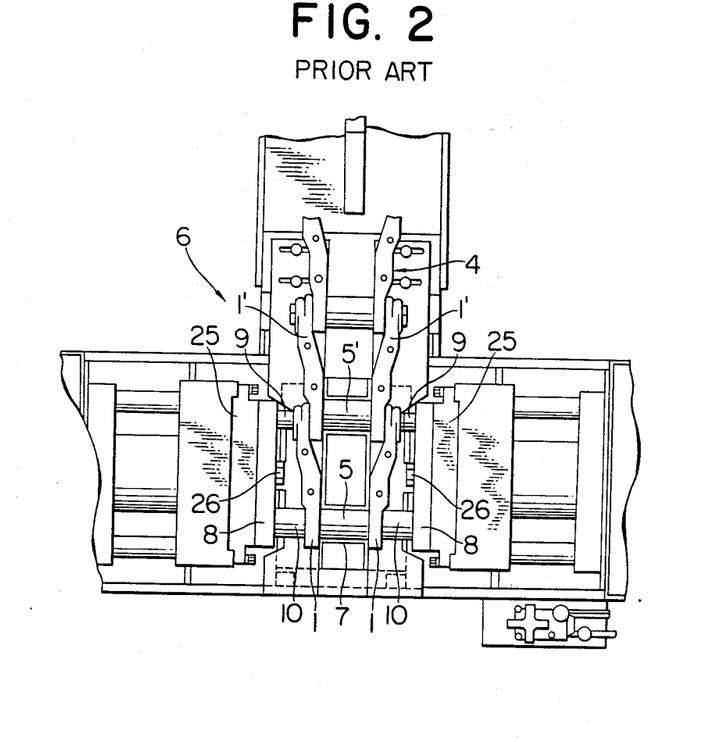
FIG. 2 is a fragmentary plan view showing the state where the track chain is being assembled by the track press of FIG. 1.
Figure 3:
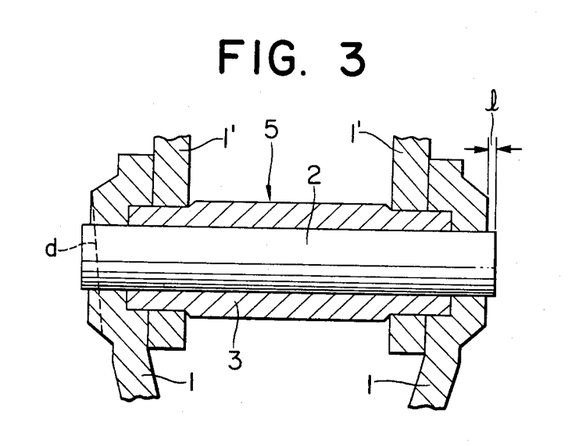
FIG. 3 is an expanded sectional view showing the joint portion of the assembled track chain.

A track chain to be assembled using the jig according to this invention is partly denoted at 4 in FIG. 1 and FIG. 2. FIG. 3 depicts the joint portion of the track chain 4. A pair of preceding links 1' and a pair of following links 1 are joined together by a track joint 5 by fitting a bushing 3 on a track pin 2, whereby a desired length of track chain 4 can be assembled.

In FIG. 1 and FIG. 2 there is shown a track press 6 as the means employed in the abovementioned assembly. The way of assembling by using this track press 6 will be schematically explained hereinafter.

FIG. 1 shows the state of track press 6 before it is started into operation, wherein the forward (upper in the drawing) portion of the track chain 4 has already been joined together with links 1' by means of a track joint 5'. Hereat, a track joint 5 is carried by a rearward (lower in the drawing) jaw 7', a pair of following links 1 are attached to a pair of pin adapters 9 and a pair of bushing adapters 10 as shown with chain lines in FIG. 1 and with a partly enlarged section in FIG. 4, said links 1 are urged from the right and left sides and advanced toward the track joints 5 and 5' so as to be jointed as shown FIG. 2 and FIG. 5, and then respective adapters are retreated again to the position as shown in FIG. 1.

Figure 4:
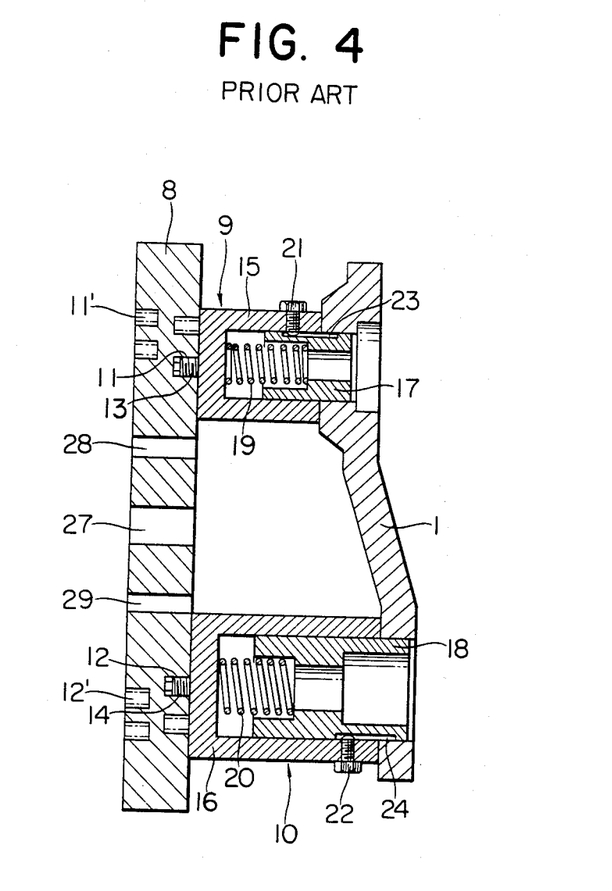
FIG. 4 is an enlarged vertical sectional plan view showing the state where a link has been attached, as shown with a chain line in FIG. 1, to the known assembling jig which is attached to said track press.
Figure 5:
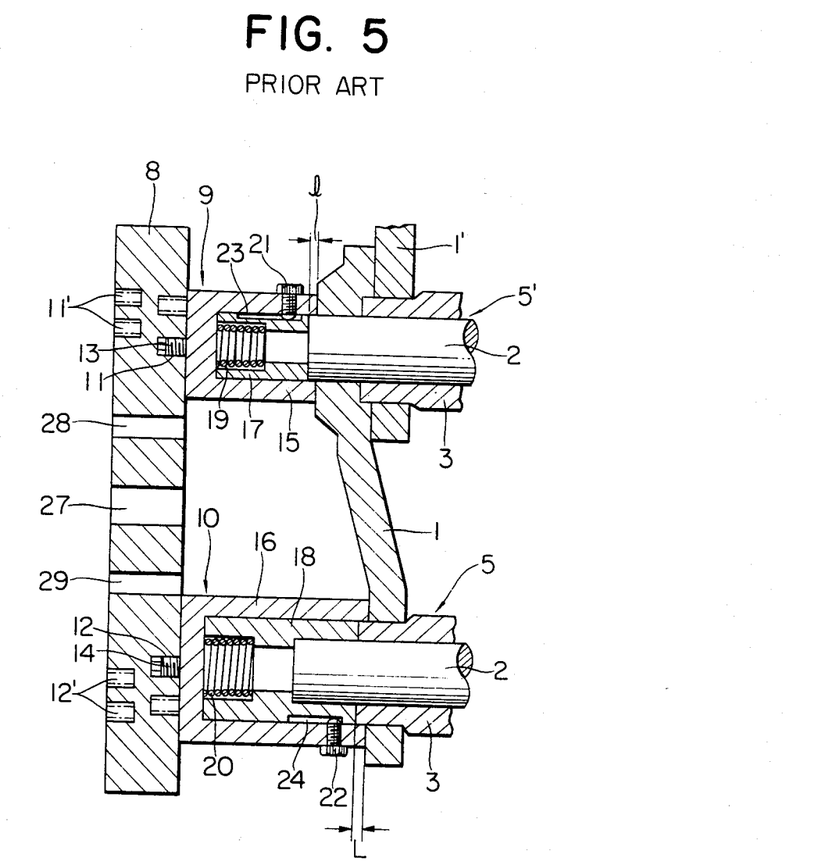
FIG. 5 is an enlarged vertical sectional plan view of the assembling jig portion shown in FIG. 2.

Particulars of respective adapters 9 and 10 are given in FIG. 4 and FIG. 5. As can be seen therefrom, adapters 9 and 10 include respectively outer cylinders 15 and 16 which have fixed, to their bottom surfaces, threaded rods 13 and 14 screwed in threaded holes 11 and 12 provided in a tool bar 8 referred to afterwards, and open in the direction opposite to said bottom surfaces. In the bores of the hollow outer cylinders 15 and 16 there are slidably fitted inner cylinders 17 and 18 respectively, and said inner cylinders 17 and 18 are always biased by springs 19 and 20 so as to protrude outwards, the springs 19 and 20 resiliently engaging the interior surfaces of the rear walls of the outer cylinders and the inner cylinders. Reference numerals 21 and 22 denote stopper screws that are screwed in transverse threaded holes in the peripheral walls of outer cylinders 15 and 16. The fore ends of said screws are fitted in grooves or slits 23 and 24 formed axially in the outer periphery of inner cylinders 17 and 18 to prevent the inner cylinders 17 and 18 from protruding all the way out of the outer cylinders 15 and 16 so that the sliding of the inner cylinders 17, 18 is limited between forwardmost and rearwardmost positions.

According to the size of the construction equipment to which the track chain 4 is attached, the track pin and link used therein will vary in length, and as a matter of course the distance between the track joints and the distance between respective links will also vary. In the case like this, it will be necessary for the above mentioned assembling device to change the positions of jaws 7 and 7', exchange adapters 9 and 10, further change the distance between adapters 9 and 10, and still further change the moving strokes of said adapters.

Figure 6A:
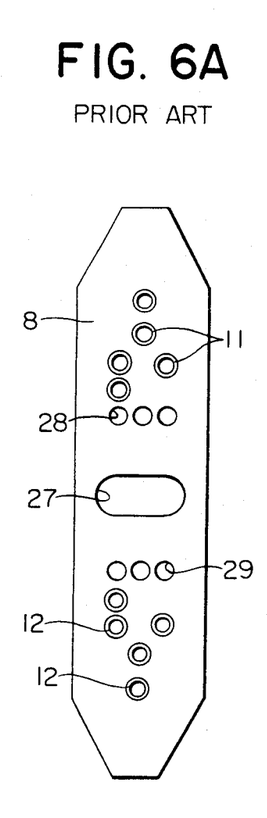
FIG. 6A and FIG. 6B are a front surface view of the tool bar shown in FIG. 4 and a back view of the tool bar shown in FIG. 5 respectively.
Figure 6B:
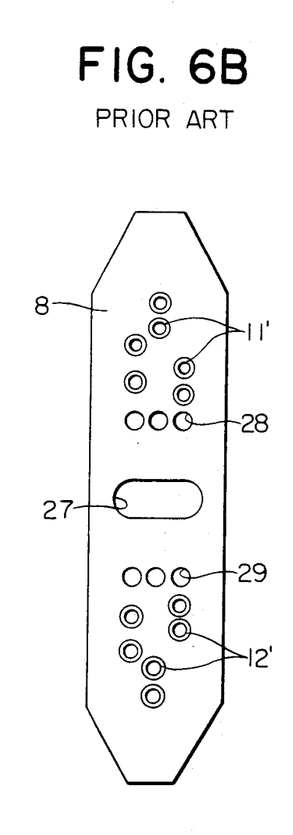

In order to change the distance between adapters 9 and 10 in the above mentioned assembling device, this applicant has improved said tool bar previously. The thus improved tool bar 8 is shown in FIG. 6A and FIG. 6B. FIGS. 6A and 6B show the surface and the back of tool bar 8 respectively. This tool bar 8 is provided at the central part with a long hole 27 for attaching the tool bar 8 to a base bed 25 of the track press 6 by means of a bolt 26. Reference numerals 28 and 29 denote small holes in which locating pins (not shown) between the tool bar 8 and the bed 25 are fitted. Threaded holes 11 and 12 are plural in number respectively and take the form of blank threaded holes arranged symmetrically with a long hole 27 as the center. The back surface is provided with plural blank threaded holes 11' and 12' which are located in positions different from those of the threaded holes 11 and 12 provided in the surface but serve for the same purposes.

Changing of the position between adapters 9 and 10 by means of the tool bar 8 of this type is effected in a manner of screwing the threaded rods 13 and 14 of the adapters 9 and 10 in the desired threaded holes 11 and 12. If the predetermined object is not still achieved, the tool bar 8 will be turned over, attached to the base bed 25 and screwed in the desired threaded holes 11' and 12'.

However, the above mentioned device is defective in that since the end opening (openings) of outer cylinder 15 and/or 16 presses on the side end faces of links 1 and 1' at every assembling operation during a long period of usage, the end face of the end opening is crushed, its inner peripheral flange is deformed so as to expand inwards, and thus the inner cylinders 17 and 18 are pressed in the inside of outer cylinders 15 and 16, whereby it becomes impossible for the inner cylinders to move for protruding from the end openings of the outer cylinders.

It is generally said that at the time of assembling (FIG. 2 and FIG. 5), by regulating the insertion distances of inner cylinders 17 and 18 against outer cylinders 15 and 16 to l and L (FIG. 5), the length l (FIG. 3) of the protrudent portion of the track pin 2 from links 1 and 1' can be held constant. However, the above mentioned device is further defective in that it is impossible to compensate the changed insertion distance as outer cylinders and/or inner cylinders wear due to usage and consequently it becomes impossible to hold the length l of the protrudent portion of the pin 2 constant, and that in order to remedy this undersirable state it is necessary to exchange adapters 9 and 10 each time and the assembling operation is retarded due to this exchanging operation.

The above mentioned device is still further defective in that, considering the distances of the opening end surfaces of outer cylinders 15 and 16 from the fitting surface of the tool bar 8, as said opening end surfaces wear due to usage, said distances are shortened so as to result in various disadvantages. Especially, when the degree of wear is unbalanced between those opening end surfaces, due to a long period of usage, links 1 and 1', which support the portion extending from the outer cylinder 16 to the outer cylinder 15, incline gradually so that it becomes impossible to attach the links 1 and 1' at right angles relative to the pin 2 and bushing 3, and in order to remedy this undesirable state it is necessary to exchange adapters 9 and 10 each time, and the assembling operation is retarded due to this exchanging operation. This phenomenon can be observed when reassembling using the links 1 and 1' after they have been used to some extent. The reason is that when links 1 and 1' are used, they wear markedly at the side end surfaces of the portions supported by the adapter 9 (which are exposed always during use and so liable to wear) more than at the side end surfaces of the portions supported by the adapter 10, and accordingly when re-assembling using these links, the re-assembled body as a whole comes to be supported slantedly by the adapters 9 and 10 in the exactly same manner as mentioned above.

In addition thereto, the above mentioned device involves the following defects. In order to join the outer cylinders 15 and 16 rigidly to the tool bar 8 it is necessary to screw the rods 13 and 14 fully in the threaded holes 11 and 12 respectively, and therefore the locations of outer cylinders 15 and 16 in the peripheral direction relative to the tool bar 8 are always constant. On the other hand, in the joint portion shown in FIG. 3, the side end surface of the link 1 wears slantwise, for instance, as shown with a dotted line d in the left side of FIG. 3, owing to the long period of usage. When breaking up the thus slantly worn ones and using them for re-assembling the links 1 and 1', the slantly worn side end surfaces come to contact with the end surfaces of the outer cylinders 15 and 16. As the locations of outer cylinders 15 and 16 at this time are constant as aforesaid, said contact results in slant wear and deformation of the end surfaces of outer cylinders 15 and 16, too. In order to remedy this undesirable state, it is required to remove the adapters 9 and 10 from the tool bar 8 each time for evening the end surfaces of outer cylinders 15 and 16 by lathe turning or the like and to discontinue the track link assembling operation during said lathe turning operation, whereby the assembling efficiency is reduced.

SUMMARY OF THE INVENTION

One object of this invention is to provide an assembling jig which is capable of eliminating the above mentioned defects inherent in the conventional assembling jigs and is designed so that inner cylinders may move freely in outer cylinders even when the inner peripheral flanges of end openings of outer cylinders for adapters are deformed.

The above mentioned object can be achieved by providing a jig which comprises forming circular recesses in the sliding portions between the inner cylinders and the inner peripheral surfaces of the end openings of the outer cylinders for adapters of the conventional jig. This is because even when the inner peripheral flanges of end openings of outer cylinders are deformed, it only deforms the circular recesses formed at said portions and does not act to deform the sliding portions between the inner cylinders and the outer cylinders so that no obstacle is constituted to the movement of inner cylinders.

Another object of this invention is to provide a jig for assembling a track chain which is capable of readily adjusting the insertion distance of an inner cylinder against an outer cylinder in an adapter.

The above mentioned object can be achieved by providing an embodiment wherein a shim is exchangeably disposed between a biasing member and the bottom inner surface of an outer cylinder.

A further object of this invention is to provide a jig for assembling a track chain which is capable of readily controlling the distance between the fore end of an outer cylinder and the fitting face of a tool bar in an adapter.

The above mentioned object can be achieved by providing an embodiment wherein a shim is exchangeably disposed between the bottom outer surface of an outer cylinder and the fitting surface of a tool bar.

A still further object of this invention is to provide an assembling jig which is capable of eliminating the other defects inherent in the aforesaid conventional jigs and changes the location of an outer cylinder for at least one of the adapters in the peripheral direction relative to a tool bar.

The above mentioned object can be achieved by providing an assembling jig wherein at least one of adapters is designed so that a hole is provided in the bottom of an outer cylinder, a screw fitted member is provided which is inserted in this hole through a center hole of an inner cylinder and screwed in a threaded hole provided in a tool bar, and a tool for rotating said screw fitted member is inserted in the center hole of said inner cylinder.

DETAILED DESCRIPTION OF THE INVENTION

Figure 7:
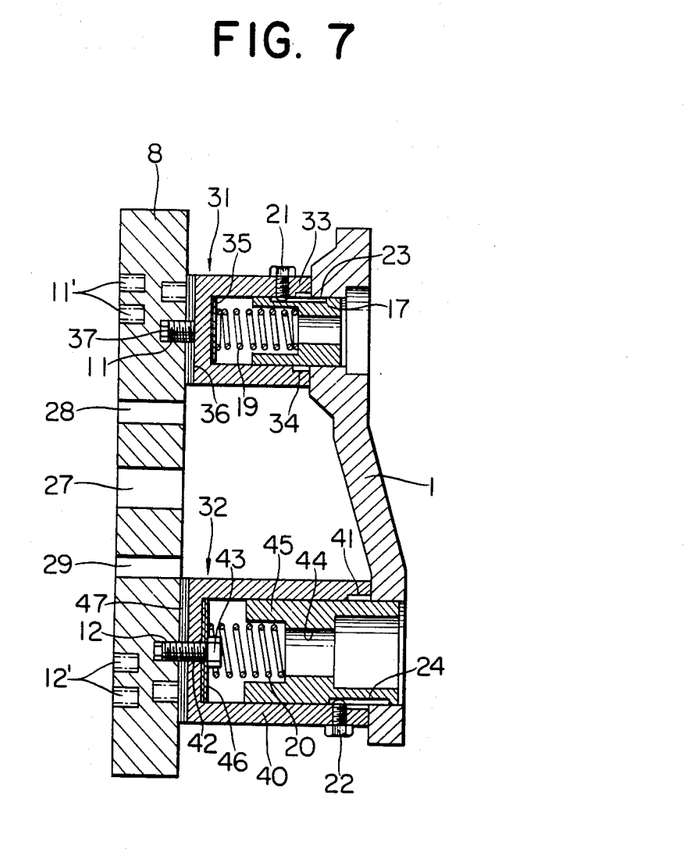
FIG. 7 is a sectional view similar to FIG. 4 illustrating the embodiment of the jig for assembling the track chain according to this invention.
Figure 8:
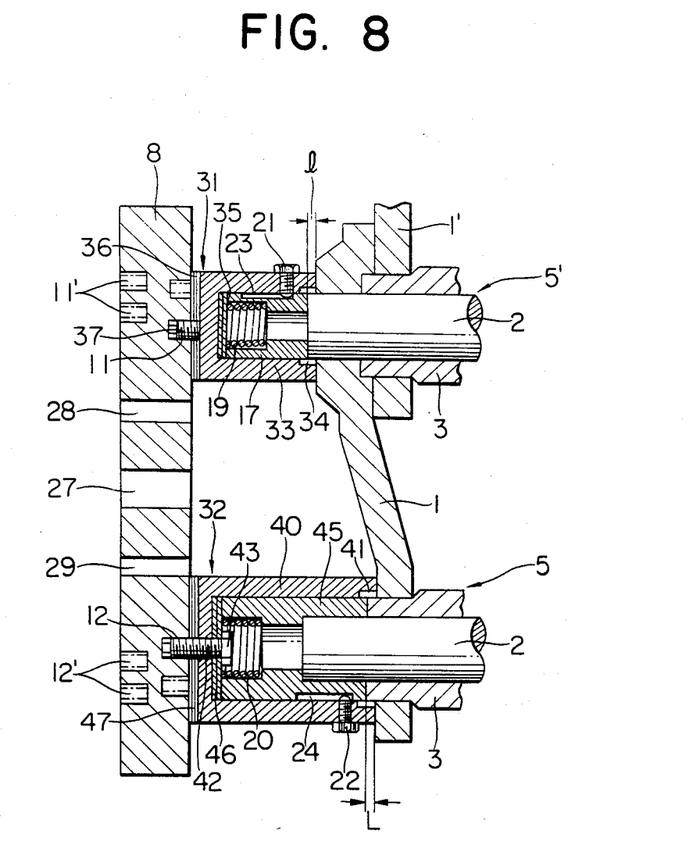
FIG. 8 is a sectional view similar to FIG. 5 showing the embodiment of the assembling jig shown in FIG. 7.

FIG. 7 and FIG. 8 illustrate one embodiment of the assembling jig according to this invention. In this embodiment, like symbols will be affixed to the same parts as those of the conventional devices shown in FIG. 4 and FIG. 5 in order to shorten the explanation, and explanation will be chiefly made of the other parts.

Reference numerals 31 and 32 denote a pin adapter and a bushing adapter respectively, and a circular recess or counterbore 34 is provided in the inner peripheral surface of the fore end opening of an outer cylinder 33 in the pin adapter 31. Between the bottom inner surface of said outer cylinder 33 and a compression spring 19 there are exchangeably provided a desired number of shims 35. Between the bottom outer surface of the outer cylinder 33 and the fitting surface of a tool bar 8, furthermore, there are exchangeably provided a desired number of shims 36. A threaded rod 37 secured to the bottom outer surface of the outer cylinder 33 passes through each shim 36.

The fore end opening of an outer cylinder 40 in the bushing adapter 32 is provided at the inner peripheral surface with a circular recess or counterbore 41 as in the case of the adapter 31, and an outer cylinder 40 is provided at the bottom with a hole 42. A bolt 43 is inserted in this hole 42 from the inside of the outer cylinder 40 through a center hole 44 provided in an inner cylinder 45. The bolt 43 is screwed in a threaded hole 12 provided in the tool bar 8 by means of a tool (not shown) inserted in this center hole 44, whereby the outer cylinder 40 is rigidly coupled with the tool bar 8. Reference numerals 46 and 47 denote shims provided in the same manner as the shims 35 and 36 except for the difference of the shim 46 from the shim 35, namely the shim 46 is coupled by passing the bolt 43 through its center hole.

Referring to the respective adapters 31 and 32, since the inner peripheral surfaces of the fore end openings of outer cylinders 33 and 40 are provided, as mentioned above, with circular recesses 34 and 41, even if the fore ends of openings of outer cylinders 33 and 40 urge the links 1 and 1', are deformed thereby and expand inwards, the expanded portions will locate within the circular recesses 34 and 41. Accordingly, there is no possibility of the sliding motion of inner cylinders 17 and 45 being disturbed by said deformation, and further the occurrence of deformation can be found easily. In case the deformation is thus found, adapters 31 and/or 32 are removed from the tool bar 8 and can be put back in their original places after having removed the deformed portions by lathe turning or the like. Therefore, the sliding motion of inner cylinders 17 and 45 can be ensured.

In the above jig embodying this invention, the thickness adjustment of shims 35, 36 and 46, 47 is made by replacing them with shims of different thickness or changing the number of shims of the same thickness used.

The thickness adjustment of shims 35 and 46 is carried out by unscrewing screws 21 and 22 from outer cylinders 33 and 40 for dismantling inner cylinders 17, 45 and springs 19 and 20, and then replacing the shims 35 and 46 or changing the number of shims used. The thickness adjustment of these shims 35 and 46 is done with the intention of holding the insertion distances, l, L (FIG. 8) of inner cylinders 17 and 45 against outer cylinders 33 and 40 constant continuously irrespective of the friction between outer cylinders 33, 40 and inner cylinders 17, 45 and thus holding the length l (FIG. 3) of the portion of track pin 2 protruding from links 1 and 1' constant. That is, if the actual insertion distance becomes more distant than the normal distance l, shims 35 and 46 will be thickened, and in contrast with this, if the actual distance becomes less distant than the distance l, shims 35 and 46 will be thinned.

The thickness adjustment of shims 36 and 47 is carried out by dismantling the threaded rod 37 and the bolt 43 from the tool bar 8, then removing the outer cylinders 33 and 40 and thereafter replacing shims 36 and 47 or changing the number of shims used. The thickness adjustment of these shims 36 and 47 is conducted when it is inevitably necessary to adjust the distance between the fitting surface of tool bar 8 and the end surfaces of openings of outer cylinders 33 and 40 caused by friction or the like of outer cylinders 33 and 40 or of links 1 and 1'. That is, if it is desired to increase the distance between both surfaces, shims 36 and 47 will be thickened, while if it is desired to decrease said distance, shims 36 and 47 will be thinned. When using outer cylinders 33 and 40 whose opening end surfaces are unbalanced in wear, as they stand, as mentioned above, it becomes impossible to build up the pin 2 and bushing 3 at right angles relative to the links 1 and 1', whereby it will become necessary to compensate the worn portions of the outer cylinders 33 and 40 by using the shims 36 and 47. This procedure is carried out in the exactly same manner also when re-assembling is carried out using the links 1 and 1' which have been used to some extent. The reason is that as mentioned above, the side end surfaces of links 1 and 1' supported by the outer cylinder 33 (which are exposed always during the use) wear more heavily than side end surfaces of links 1 and 1' supported by the outer cylinder 40, and accordingly it becomes impossible to build up the pin 2 and bushing 3 at right angles relative to the links 1 and 1' without making the aforesaid compensation.

The pin adapter 31 is different from the bushing adapter 32 in that the former is fitted into the tool bar 8 by means of the threaded rod 37 and the latter is fitted into the tool bar 8 by means of the bolt 43. In this connection, however, it is to be noted that since this difference was made up only for the purpose of facilitating explanation, the threaded rod and bolt may be exchanged inversely and both may be threaded rods or bolts respectively.

In this case, the outer cylinder 40, arranged to be rigidly coupled with the tool bar 8 by means of the bolt 43, is turned before the bolt 43 is screwed up, so as to have a desired position in the circumferential direction relative to the tool bar 8. The reason for doing this is that as stated previously, when reassembling is carried out by using the links 1 and 1' whose side end surfaces have worn slantedly, the end surfaces of the outer cylinders 33 and 40 contacting with the links 1 and 1' likewise come to wear slantedly and deform, and therefore by changing the position of the outer cylinder 40 in the circumferential direction as mentioned above, it is rendered possible to wear and deform the opening end surfaces of the outer cylinders 33 and 40 uniformly throughout the whole circumference, whereby the number of restoring operations including the above mentioned lathe turning or the like can be reduced and the output efficiency can be increased by eliminating the waste that much.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. In a jig for assembling a track chain comprising pin adapters and bushing adapters attached detachably to tool bars, each adapter comprising an outer hollow cylinder, an inner cylinder received slidably in a bore of said outer cylinder, biasing means held within said outer cylinder for biasing the forward end of said inner cylinder so that it protrudes outwardly from a forward end opening of said bore of said outer cylinder, and stop means attached to said outer cylinder for preventing said inner cylinder from protruding from said outer cylinder beyond a forwardmost position, the improvement comprising each of said outer cylinders has a circular recess in the forward end of the bore of said outer cylinder, which circular recess is coaxial with and of greater diameter than said bore.

2. A jig according to claim 1, wherein a shim is removably provided between said biasing means and the bottom inner surface of said outer cylinder.

3. A jig according to claim 1 or claim 2, wherein a shim is removably provided between the bottom outer surface of said outer cylinder and the surface of the associated tool bar.

4. A jig according to claim 1, wherein said circular recess comprises a flat-bottomed counterbore.

5. A jig according to claim 1, wherein said outer cylinder has a transverse threaded through-hole in a side wall thereof located rearwardly of said circular recess, said inner cylinder has an elongated groove in the outer peripheral surface thereof, said groove extending in the lengthwise direction of said inner cylinder, and said stop means comprises a screw threadedly coupled in said transverse threaded through-hole and extending into said elongated groove, said screw moving along said groove between opposite ends of said elongated groove to define forwardmost and rearwardmost positions of said inner cylinder.

6. In a jig for assembling a track chain comprising pin adapters and bushing adapters attached detachably to tool bars, each adapter comprising an outer hollow cylinder, an inner hollow cylinder received slidably in a bore of said outer cylinder, said inner cylinder having a bore opening at opposite ends of said inner cylinder, biasing means held within said outer cylinder for biasing the forward end of said inner cylinder so that it protrudes outwardly from a forward end opening of said outer cylinder, and stop means attached to said outer cylinder for preventing said inner cylinder from protruding out of said outer cylinder, wherein the improvement comprises at least one of said pin adapter and said bushing adapter associated with each of said tool bars has a through-hole therein extending through a rearward wall of the associated outer cylinder, each of said tool bars has a plurality of threaded holes therein, a bolt is inserted through said through-hole in said rearward wall of said outer cylinder and is threadedly coupled into one of said threaded holes in the associated tool bar to secure the associated adapter to said tool bar, said bore of said inner cylinder being sufficiently large to allow said bolt to pass therethrough during installation or removal of said bolt, and a shim is removably provided between said biasing means and the inner surface of said rearward wall of said outer cylinder.

7. A jig according to claim 6, wherein a shim is removably provided between the outer surface of said rear wall of said outer cylinder and a fitting surface of said tool bar.

8. A jig for assembling a track chain, comprising:
a tool bar having a plurality of threaded holes formed therein at spaced apart locations along a face thereof;
a pin adapter rigidly mounted on said tool bar, said pin adapter including a first hollow outer cylinder having a bore which opens at the forward end of said first outer cylinder remote from said tool bar and a counterbore formed in said open forward end, and further having a rear wall proximal to said tool bar, which rear wall ha a threaded projection which is threadedly coupled in one of said threaded holes in said tool bar whereby said pin adapter is rigidly secured to said tool bar, said pin adapter further including at least one first shim removably interposed between and in face-to-face contact with said tool bar and the outer surface of said rear wall of said first outer cylinder, a first inner cylinder slidably disposed in said bore of said first outer cylinder, at least one second shim removably positioned in contact with the interior surface of said rear wall of said first outer cylinder, a first compression spring in resilient engagement with said second shim and a rear surface of said first inner cylinder, which first spring urges said first inner cylinder forwardly out of the open forward end of said first outer cylinder, and means for stopping said first inner cylinder from moving past a forwardmost position relative to said first outer cylinder; and
a bushing adapter rigidly mounted on said tool bar, said bushing adapter including a second hollow outer cylinder having a bore which opens at the forward end of said second outer cylinder remote from said tool bar and a counterbore formed in said open forward end of said second outer cylinder, said second outer cylinder further having a rear wall proximal to said tool bar, which rear wall has a through-hole therein, said bushing adapter further including at least one third shim removably interposed between and in face-to-face contact with said tool bar and the outer surface of said rear wall of said second outer cylinder, a second inner cylinder slidably disposed in said bore of said second outer cylinder, at least one fourth shim removably positioned in contact with the inner surface of said rear wall of said second outer cylinder, a second compression spring in resilient engagement with said fourth shim and a rear surface of said second inner cylinder, which second spring urges said second inner cylinder forwardly out of the open forward end of said second outer cylinder, means for stopping said second inner cylinder from moving past a forwardmost position relative to said second outer cylinder, and a bolt inserted through said through-hole in said rear wall of said second outer cylinder and threadedly coupled in another one of said threaded holes in said tool bar, which bolt rigidly secures said bushing adapter to said tool bar and secures said fourth shim against the inner surface of said rear wall of said second outer cylinder.

* * * * *